United States Patent
Olsson et al.

(10) Patent No.: US 9,253,057 B2
(45) Date of Patent: Feb. 2, 2016

(54) EVALUATION OF PERFORMANCE OF SOFTWARE APPLICATIONS

(71) Applicant: International Business Machines Corporation, Armonk, NY (US)

(72) Inventors: Stig A. Olsson, Apex, NC (US); Terrence D. Smetanka, Raleigh, NC (US); Geetha Vijayan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 13/949,547

(22) Filed: Jul. 24, 2013

(65) Prior Publication Data

US 2013/0311651 A1 Nov. 21, 2013

Related U.S. Application Data

(63) Continuation of application No. 10/383,847, filed on Mar. 6, 2003, now Pat. No. 8,527,620.

(51) Int. Cl.
| | |
|---|---|
| *G06F 15/173* | (2006.01) |
| *H04L 12/26* | (2006.01) |
| *G06Q 10/06* | (2012.01) |
| *H04L 29/08* | (2006.01) |

(52) U.S. Cl.
CPC ............... *H04L 43/06* (2013.01); *G06Q 10/06* (2013.01); *G06Q 10/06375* (2013.01); *H04L 67/22* (2013.01)

(58) Field of Classification Search
None
See application file for complete search history.

(56) References Cited

U.S. PATENT DOCUMENTS

| | | |
|---|---|---|
| 5,295,244 A | 3/1994 | Dev et al. |
| 5,742,819 A | 4/1998 | Caccavale |
| 5,793,753 A | 8/1998 | Hershey et al. |
| 5,812,780 A | 9/1998 | Chen et al. |
| 6,000,045 A | 12/1999 | Lewis |
| 6,041,352 A | 3/2000 | Burdick et al. |
| 6,052,733 A | 4/2000 | Mahalingam et al. |
| 6,108,700 A | 8/2000 | Maccabee et al. |
| 6,163,775 A | 12/2000 | Wiaschin et al. |
| 6,177,886 B1 | 1/2001 | Billington et al. |
| 6,269,330 B1 | 7/2001 | Cidon et al. |
| 6,278,694 B1 | 8/2001 | Wolf et al. |
| 6,327,550 B1 | 12/2001 | Vinberg et al. |

(Continued)

OTHER PUBLICATIONS

Notice of Allowance (Mail Date Apr. 25, 2013) for U.S. Appl. No. 10/383,847, filed Mar. 6, 2003, First Named Inventor Stig A. Olsson.

*Primary Examiner* — Kenny Lin
(74) *Attorney, Agent, or Firm* — Schmeiser, Olsen & Watts, LLP; David M. Quinn

(57) ABSTRACT

A method and system for evaluating performance of software applications of different web sites. Steps in a first software application of a first web site are mapped to respective similar-function steps in a second software application of a second web site. The mapping for each step in the first software application includes associating both each step in the first software application and the respective similar-function step in the second software with a respective task. Measures of performance of each mapped step in the first software application and measures of performance of the respective similar-function steps and of other steps in the second software application are determined and included in a report. A measure of performance of the first software application and a measure of performance of the second software application are included in the report.

18 Claims, 7 Drawing Sheets

(56) References Cited

U.S. PATENT DOCUMENTS

| | | |
|---|---|---|
| 6,356,205 B1 | 3/2002 | Salvo et al. |
| 6,397,359 B1 | 5/2002 | Chandra et al. |
| 6,401,119 B1 | 6/2002 | Fuss et al. |
| 6,425,006 B1 | 7/2002 | Chari et al. |
| 6,430,712 B2 | 8/2002 | Lewis |
| 6,449,739 B1 | 9/2002 | Landan |
| 6,499,117 B1 | 12/2002 | Tanaka |
| 6,510,463 B1 | 1/2003 | Farhat et al. |
| 6,556,659 B1 | 4/2003 | Bowman-Amuah |
| 6,732,168 B1 | 5/2004 | Bearden et al. |
| 6,734,878 B1 | 5/2004 | DeLuca et al. |
| 6,738,933 B2 | 5/2004 | Fraenkel et al. |
| 6,757,543 B2 | 6/2004 | Moran et al. |
| 6,763,380 B1 | 7/2004 | Mayton et al. |
| 6,765,864 B1 | 7/2004 | Natarajan et al. |
| 6,766,368 B1 | 7/2004 | Jakobson et al. |
| 6,779,032 B1 | 8/2004 | Hericourt |
| 6,792,455 B1 | 9/2004 | DeLuca et al. |
| 6,792,459 B2 | 9/2004 | Elnozahy et al. |
| 6,801,940 B1 | 10/2004 | Moran et al. |
| 6,807,156 B1 | 10/2004 | Veres et al. |
| 6,832,341 B1 | 12/2004 | Vijayan |
| 6,857,020 B1 | 2/2005 | Chaar et al. |
| 6,859,831 B1 | 2/2005 | Gelvin et al. |
| 6,871,324 B2 | 3/2005 | Hand et al. |
| 6,885,302 B2 | 4/2005 | Seal et al. |
| 6,889,222 B1 | 5/2005 | Zhao |
| 6,892,235 B1 | 5/2005 | Daude et al. |
| 6,901,442 B1 | 5/2005 | Schwalier et al. |
| 6,904,458 B1 | 6/2005 | Bishop et al. |
| 6,928,471 B2 | 8/2005 | Pabari et al. |
| 6,934,745 B2 | 8/2005 | Krautkremer |
| 6,941,358 B1 | 9/2005 | Joiner et al. |
| 6,944,673 B2 | 9/2005 | Malan et al. |
| 7,043,549 B2 | 5/2006 | Breese et al. |
| 7,047,291 B2 | 5/2006 | Breese et al. |
| 7,067,204 B2 * | 6/2006 | Nomura et al. ............... 428/698 |
| 7,100,152 B1 * | 8/2006 | Birum et al. ................... 717/131 |
| 2002/0004828 A1 | 1/2002 | Davis et al. |
| 2002/0073195 A1 | 6/2002 | Hellerstein et al. |
| 2002/0087882 A1 | 7/2002 | Schneier et al. |
| 2002/0097267 A1 | 7/2002 | Dinan et al. |
| 2002/0161875 A1 | 10/2002 | Raymond |
| 2003/0093460 A1 | 5/2003 | Kinney et al. |
| 2003/0120762 A1 | 6/2003 | Yepishin et al. |
| 2003/0145079 A1 | 7/2003 | Breese et al. |
| 2003/0145080 A1 | 7/2003 | Breese et al. |
| 2003/0167406 A1 | 9/2003 | Beavers |
| 2004/0015846 A1 | 1/2004 | Haisraeli |
| 2004/0064546 A1 | 4/2004 | Olsson et al. |
| 2004/0205184 A1 | 10/2004 | Olsson et al. |

* cited by examiner

| | 301 Company Web Shopping Transaction | 302 Average Response Time(sec) | 303 Performance Threshold | 304 Competitor Transaction | 305 Average Response Time(sec) | 306 Performance Threshold | 307 Supporting application |
|---|---|---|---|---|---|---|---|
| 321 Task | | | | | | | |
| 322 Access Home Page | Homepage | | 5.0 | Homepage | | 5.0 | application 1 |
| 323 Navigate Hierarchy | Products and Services | | 6.0 | Products | | 6.0 | application 1 |
| 324 Navigate Hierarchy | Notebooks | | 6.0 | Notebooks | | 6.0 | application 2 |
| 325 Select Products | Model | | 6.0 | Model | | 6.0 | application 2 |
| 326 Customize and Buy | Customize | | 6.0 | Customize and price | | 6.0 | application 3 |
| 327 Customize and Buy | | | | Continue | | 6.0 | |
| 328 Customize and Buy | View Configuration and Buy | | 6.0 | Accessories | | 6.0 | application 3 |
| 329 Add to Cart | Add to cart | | 7.2 | Add to Cart | | 6.0 | application 2 |
| 330 Checkout | Proceed to Checkout | | 7.2 | Proceed to checkout | | 7.2 | application 2 |
| 331 Checkout | Continue | | 7.2 | Checkout 1 | | 7.2 | application 2 and 4 |
| 332 Checkout | | | | Checkout 2a | | 7.2 | |
| 333 Checkout | | | | Checkout 2b | | 7.2 | |
| 334 Total | | | | | | | |

FIG. 3

| Task | Company Web Shopping Transaction | Average Response Time(sec) | Performance Threshold | Competitor Transaction | Average Response Time(sec) | Performance Threshold | Supporting application |
|---|---|---|---|---|---|---|---|
| Access Home Page | Homepage | 1.62 | 5.0 | Homepage | 1.106 | 5.0 | application 1 |
| Navigate Hierarchy | Products and Services | 1.057 | 6.0 | Products | 2.526 | 6.0 | application 1 |
| Navigate Hierarchy | Notebooks | 2.158 | 6.0 | Notebooks | 1.15 | 6.0 | application 2 |
| Select Products | Model | 1.546 | 6.0 | Model | 1.073 | 6.0 | application 2 |
| Customize and Buy | Customize | 4.802 | 6.0 | Customize and price | 0.622 | 6.0 | application 3 |
| Customize and Buy | | | | Continue | 2.283 | 6.0 | |
| Customize and Buy | View Configuration and Buy | 1.693 | 6.0 | Accessories | 1.293 | 6.0 | application 3 |
| Add to Cart | Add to cart | 6.425 | 7.2 | Add to Cart | 2.256 | 6.0 | application 2 |
| Checkout | Proceed to Checkout | 2.984 | 7.2 | Proceed to checkout | 2.387 | 7.2 | application 2 |
| Checkout | Continue | 13.307 | 7.2 | Checkout 1 | 2.019 | 7.2 | application 2 and 4 |
| Checkout | | | | Checkout 2a | 1.568 | 7.2 | |
| Checkout | | | | Checkout 2b | 1.403 | 7.2 | |
| Total | | 35.582 | | | 19.686 | | |

FIG. 4

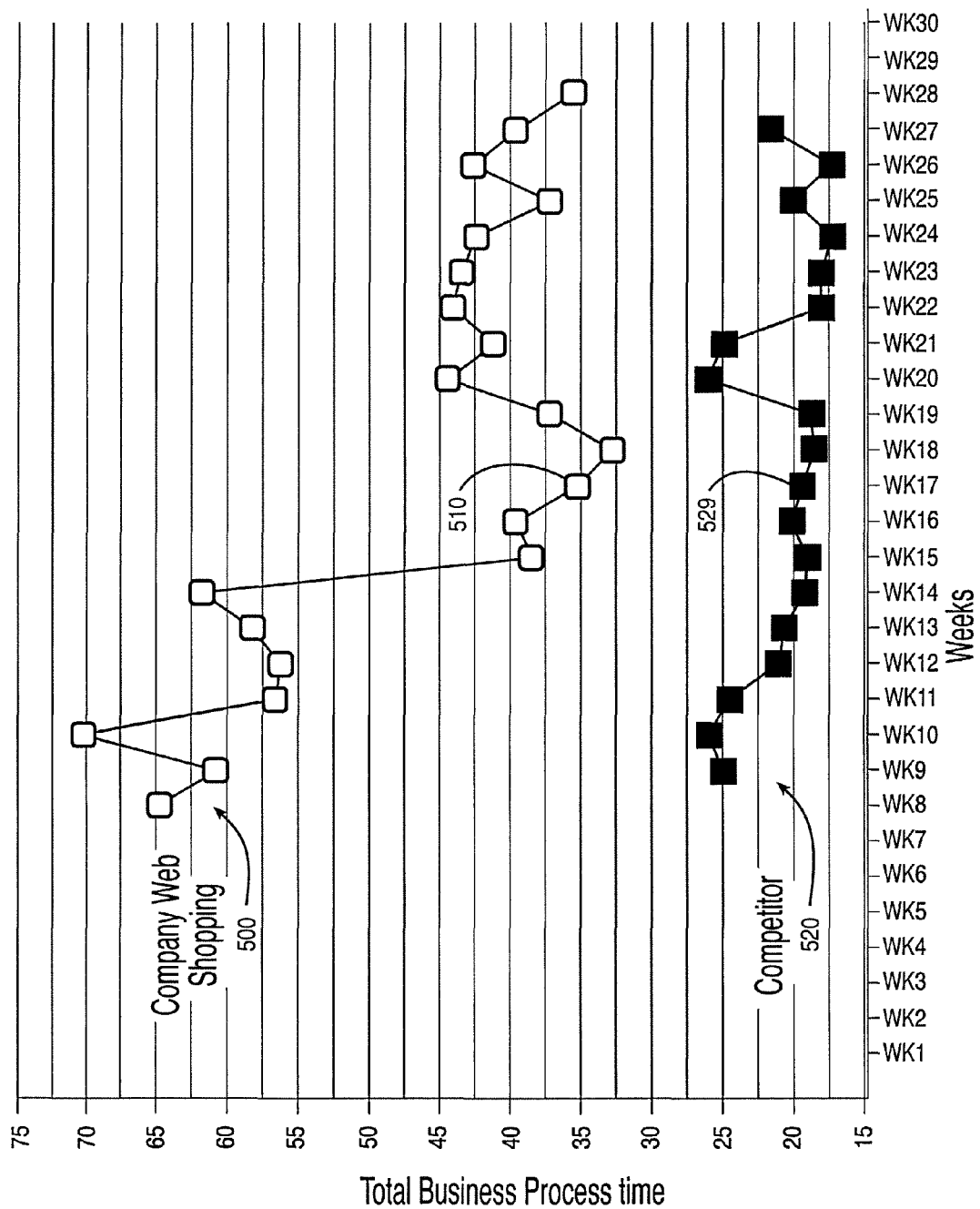

EVALUATION OF PERFORMANCE OF SOFTWARE APPLICATIONS

This application is a continuation application claiming priority to Ser. No. 10/383,847, filed Mar. 6, 2003, now U.S. Pat. No. 8,527,620 issued Sep. 3, 2013.

CROSS-REFERENCES TO RELATED APPLICATIONS, AND COPYRIGHT NOTICE

The present patent application is related to co-pending patent applications: Method and System for Probing in a Network Environment, application Ser. No. 10/062,329, filed on Jan. 31, 2002, Method and System for Performance Reporting in a Network Environment, application Ser. No. 10/062,369, filed on Jan. 31, 2002, End to End Component Mapping and Problem-Solving in a Network Environment, application Ser. No. 10/122,001, filed on Apr. 11, 2002, Graphics for End to End Component Mapping and Problem-Solving in a Network Environment, application Ser. No. 10/125,619, filed on Apr. 18, 2002, E-Business Operations Measurements, application Ser. No. 10/256,094, filed on Sep. 26, 2002, and E-Business Operations Measurements Reporting, filed on even date herewith. These co-pending patent applications are assigned to the assignee of the present application, and herein incorporated by reference. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling, and more particularly to methods and systems for evaluating the performance of information handling in a network environment.

BACKGROUND OF THE INVENTION

Various approaches have been proposed for monitoring, simulating, or testing web sites. However, some of these approaches address substantially different problems (e.g. problems of simulation and hypothetical phenomena), and thus are significantly different from the present invention. Other examples include services available from vendors such as Atesto Technologies Inc., Keynote Systems, and Mercury Interactive Corporation. These services may involve a script that runs on a probe computer. The approaches mentioned above do not necessarily allow some useful comparisons.

It is very useful to measure the performance of an application, and to measure performance against target values. For example, the application being evaluated may be a web site, web service, or another application accessible to a number of users via a network. Concerning two or more such applications, it is very useful to compare numerical measures. There may be practical difficulties in defining useful performance targets, or comparing numerical measures. Thus there is a need for systems and methods that solve problems related to performance targets and comparison.

SUMMARY OF THE INVENTION

An example of a solution to problems mentioned above comprises providing a generic task list, and applying the generic task list to a first business process and a second business process. Applying the generic task list includes mapping a transaction step in the first business process to a similar transaction step in the second business process.

Another example of a solution comprises mapping a transaction step in a first application to a similar transaction step in a second application, a current threshold value, and a supporting application, inputting performance measures for the first and second applications, and outputting a performance comparison report, based on the mapping and the performance measures. The mapping, the inputting, and the outputting may be performed for a plurality of transaction steps in the first application and a plurality of transaction steps in the second application.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

FIG. 3 is an example of a comparison report template, and documentation of two business processes.

FIG. 4 is an example of a performance comparison report, that communicates averages of response time values per transaction step, and averages of total response time values for each business process.

FIG. 5 shows an example of a trend report, based on weekly averages of total response time values for each business process.

DETAILED DESCRIPTION

Figure 1:
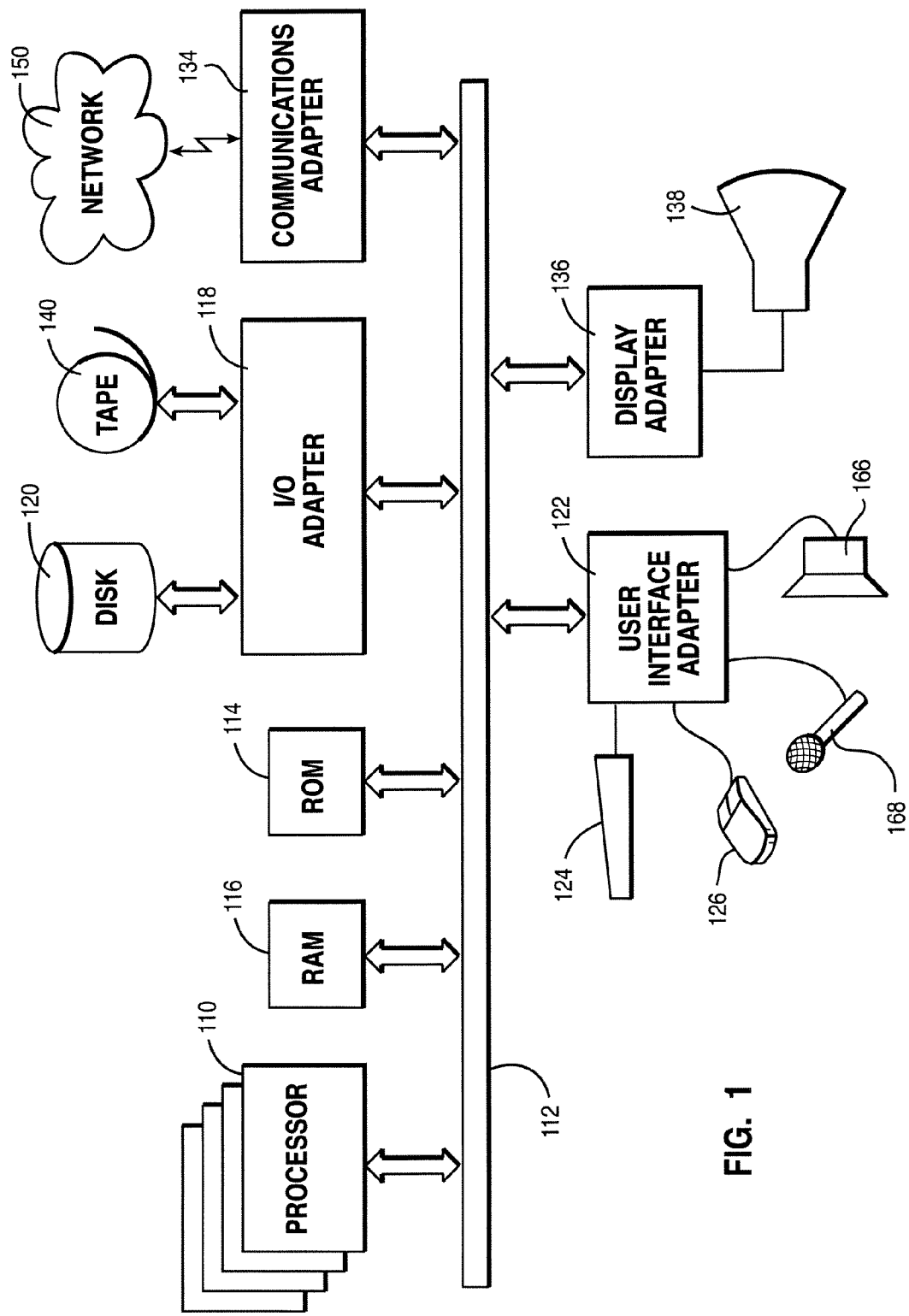
FIG. 1 illustrates a simplified example of a computer system capable of performing the present invention.

The examples that follow involve the use of one or more computers and may involve the use of one or more communications networks. The present invention is not limited as to the type of computer on which it runs, and not limited as to the type of network used. The present invention is not limited as to the type of medium or format used for output. Means for providing graphical output may include sketching diagrams by hand on paper, printing images or numbers on paper, displaying images or numbers on a screen, or some combination of these, for example. A model of a solution might be provided on paper, and later the model could be the basis for a design implemented via computer, for example.

The following are definitions of terms used in the description of the present invention and in the claims:

"About," with respect to numbers, includes variation due to measurement method, human error, statistical variance, rounding principles, and significant digits.

"Application" means any specific use for computer technology, or any software that allows a specific use for computer technology.

"Availability" means ability to be accessed or used.

"Business process" means any process involving use of a computer by any enterprise, group, or organization; the process may involve providing goods or services of any kind.

"Client-server application" means any application involving a client that utilizes a service, and a server that provides a service. Examples of such a service include but are not limited to: information services, transactional services, access to databases, and access to audio or video content.

"Comparing" means bringing together for the purpose of finding any likeness or difference, including a qualitative or quantitative likeness or difference. "Comparing" may involve answering questions including but not limited to: "Is a measured response time greater than a threshold response time?" Or "Is a response time measured by a remote probe significantly greater than a response time measured by a local probe?"

"Component" means any element or part, and may include elements consisting of hardware or software or both.

"Computer-readable storage device" means computer memory, such as floppy disks, hard disks, Random Access Memory (RAM), Read Only Memory (ROM), CD-ROM, flash ROM, non-volatile ROM, and non-volatile memory.

"Mapping" means associating, matching or correlating.

"Measuring" means evaluating or quantifying; the result may be called a "Measure" or "Measurement."

"Output" or "Outputting" means producing, transmitting, or turning out in some manner, including but not limited to printing on paper, or displaying on a screen, writing to a disk, or using an audio device.

"Performance" means execution or doing; for example, "performance" may refer to any aspect of an application's operation, including availability, response time, time to complete batch processing or other aspects.

"Probe" means any computer used in evaluating, investigating, or quantifying the functioning of a component or the performance of an application; for example a "probe" may be a personal computer executing a script, acting as a client, and requesting services from a server.

"Production environment" means any set of actual working conditions, where daily work or transactions take place.

"Response time" means elapsed time in responding to a request or signal.

"Script" means any program used in evaluating, investigating, or quantifying performance; for example a script may cause a computer to send requests or signals according to a transaction scenario. A script may be written in a scripting language such as Perl or some other programming language.

"Service level agreement" (or "SLA") means any oral or written agreement between provider and user. For example, "service level agreement" includes but is not limited to an agreement between vendor and customer, and an agreement between an information technology department and an end user. For example, a "service level agreement" might involve one or more client-server applications, and might include specifications regarding availability, response times or problem-solving.

"Statistic" means any numerical measure calculated from a sample.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

"Threshold value" means any value used as a borderline, standard, or target; for example, a "threshold value" may be derived from customer requirements, corporate objectives, a service level agreement, industry norms, or other sources.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system may comprise one or more memories. The system has user interface adapter 122 for connecting keyboard 124, mouse 126, or other user interface devices such as audio output device 166 and audio input device 168 to bus 112. The system has communication adapter 134 for connecting the information handling system to a communications network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
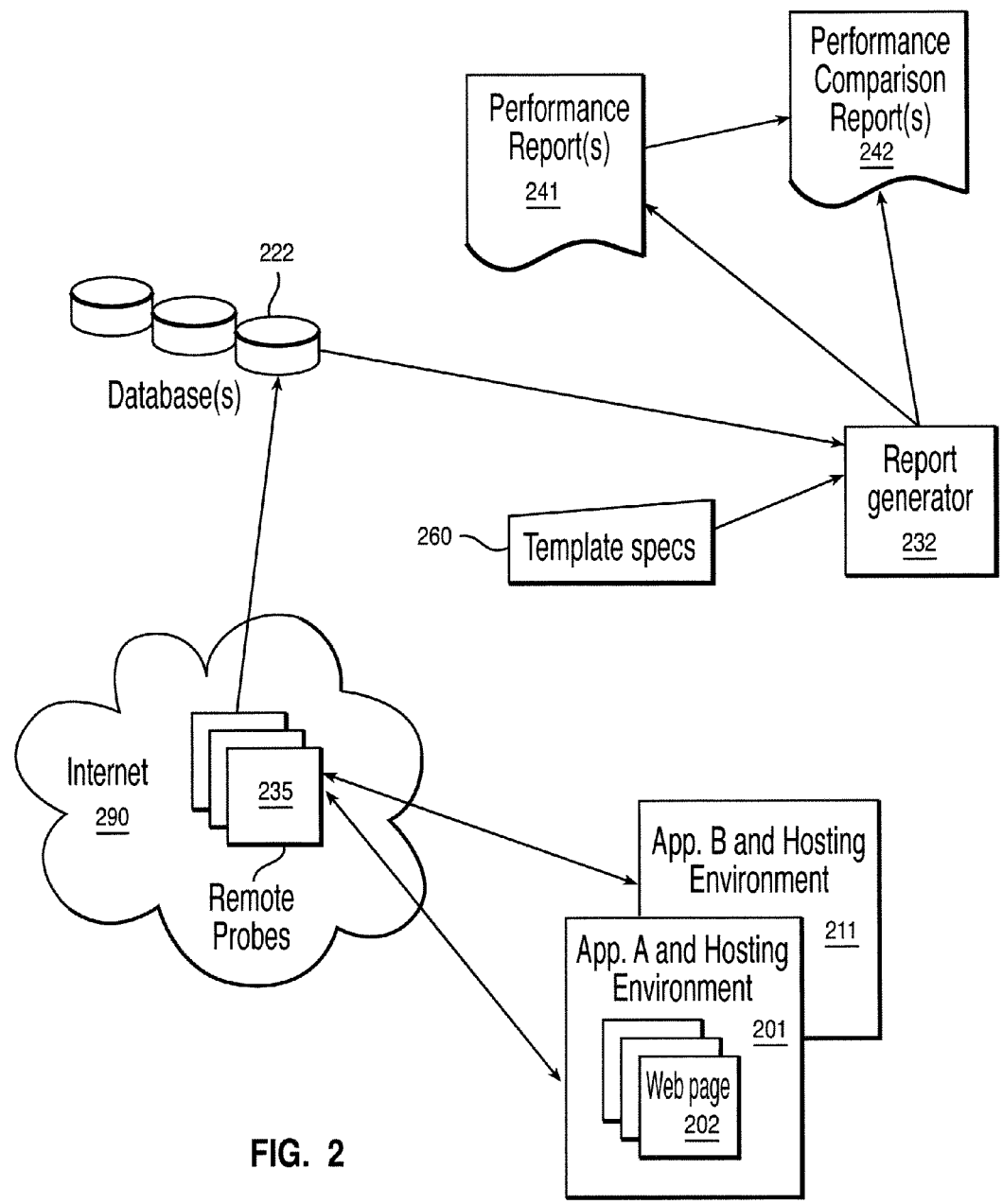
FIG. 2 is a block diagram illustrating one example of how the present invention may be implemented for evaluating two or more applications.

FIG. 2 is a block diagram illustrating one example of how the present invention may be implemented for evaluating two or more applications. To begin with an overview, this example involves scripts that emulate end users' transactions. These scripts are deployed on a set of agents or probes (shown at 235) that are located around the world. The locations depend on the applications being evaluated (shown with their hosting environments at 201 and 211) and where the end users are located. The probes at 235 collect measurement data (arrows connecting probes at 235 with applications at 201 and 211) and send the data to a repository (database(s) at 222). Report generator 232 uses a template (symbolized by "template specs" at 260; also see FIG. 3) and data from databases at 222 to generate near-real-time reports 241 on each application being evaluated. This information may be retrieved and summarized (symbolized by the arrow from 241 to 242) to create performance comparison reports shown at 242. (Please see FIG. 4 as an example of a report symbolized by report 242 in FIG. 2.) Report generator 232 and probes at 235 symbolize both hardware and software.

Reports 241 and 242 in FIG. 2 are ways of outputting data or statistics or both, and ways of mapping data or statistics or both to threshold values. Report generator 232 may use specifications of threshold values. Threshold values may be derived from a service level agreement or from customer requirements, corporate objectives, industry norms, or other sources.

In other words, probes at 235, database(s) at 222, report generator 232, and communication links among them (symbolized by arrows) may serve as means for inputting performance measures for first and second applications (at 201 and 211) being evaluated. Report generator 232, and a template (symbolized by "template specs" at 260) may serve as means for mapping a transaction step in a first application to a similar transaction step in a second application, to a current threshold value, and to a supporting application. Supporting applications for application A may be located in hosting environment 201 or elsewhere. Report generator at 232, and report(s) at 242, may serve as means for outputting a performance comparison report based on the mapping and the performance measurements.

In the example in FIG. 2, probes at 235, database(s) at 222, report generator 232, and communication links among them (symbolized by arrows) may serve as means for collecting data from a production environment. Application A, and the hosting environment, are shown at 201. Application B, and the hosting environment, are shown at 211. For example, the hosting environment may be a typical, electronic business (e-business) infrastructure, including a variety of network, server, and middleware components. Web pages at 202 are shown as a way for users to interact with Application A. Report generator 232 may provide a means for deriving some performance measures from the data (e.g. calculating statistics).

Turning now to some details of FIG. 2, two or more applications (at 201 and 211) may be compared. To give some non-limiting examples from commercial web sites, the applications at 201 and 211 may comprise: an application that creates customers' orders; an application utilized in fulfilling customers' orders; an application that responds to customers' inquiries; and an application that supports real-time transactions. The two or more applications (shown at 201 and 211) may be any applications that are accessible via any network at 290, assuming the applications and network are available for use by those doing the evaluation. For example, comparing applications at 201 and 211 may involve comparing answers to questions such as: What proportion of the time is an application available to its users? How much time does it take to complete a common transaction step (e.g. a log-on step)? How stable are these figures over a period of weeks or months?

Creating performance comparison reports shown at 242 may for example include:
1. Developing probe scripts to be used to collect benchmark data.
2. Deploying the scripts on appropriate measurement agents (shown at 235).
3. Generating the comparison performance report (shown at 242) with weekly averages of response times.

Providing a script for a probe would comprise defining a set of transactions that are frequently performed by end users. Employing a plurality of probes would comprise placing at least one remote probe (shown at 235 in FIG. 2) at each location having a relatively large population of end users. End-to-end measurement of an organization's external applications for customers, business partners, suppliers, etc. may involve probes (shown at 235) on the Internet (shown at 290) or some other network. The example in FIG. 2 involves defining a representative transaction set, and deploying remote application probes (shown at 235) at relevant end-user locations.

The example in FIG. 2 may involve probing (arrows connecting probes at 235 with applications at 201 and 211) transaction steps in a business process, and mapping each of the transaction steps to a performance target. For example, response times are measured on a transaction level. These transaction steps could be any steps involved in using an application. For example, each transaction step in a business process is identified and documented. One good way of documenting transaction steps is as follows. Transaction steps may be displayed in a table containing the transaction step number, step name, and a description of what action the end user takes to execute the step. For example, a row in a table may read as follows. Step number: "NAQS2." Step name: "Log on." Description: "Enter Login ID/Password. Click on Logon button."

For example, remote probes shown in FIG. 2 at 235 may be implemented by contracting for probing services available from vendors such as Mercury Interactive Corporation, but services from another vendor could be used, or remote probes could be implemented by other means (e.g. directly placing probes at various Internet Service Providers (ISP's)). No local probes are shown inside hosting environments at 201 and 211, because at least one of the hosting environments might be inaccessible to those doing the evaluation in this example. Database 222 may be implemented by using a database provided by a vendor of probing services, or the parties doing the evaluation could implement the database themselves. Database management software could be used, such as software products sold under the trademarks DB2 (by IBM), ORACLE, INFORMIX, SYBASE, MYSQL, Microsoft Corporation's SQL SERVER, or similar software. An automated reporting tool (shown as report generator 232) may run continuously at set intervals, obtaining data from database 222, and sending reports 241 and 242 via email to those doing the evaluation. Reports 241 and 242 also could be posted on a web site at the set intervals. Report generator 232 may be implemented by using the Perl scripting language and the AIX operating system, for example. However, some other programming language could be used, and another operating system could be used, such as LINUX, or another form of UNIX, or some version of Microsoft Corporation's WINDOWS, or some other operating system.

Continuing with details of FIG. 2, here are examples of typical run-time settings from probes at 235:
 1. Performance measurements are taken continuously, 7 days per week, 24 hours per day, including an application's scheduled and unscheduled down time.
 2. Performance measurements are sampled at an interval of approximately every hour, from locations (shown at 235) representative of the customer base.
 3. For a dial-in client base, probing is appropriately throttled or adjusted via software to represent this aspect of the end-user perspective. Measurements are presented in this context.
 4. Timeouts are set at a maximum of 45 seconds at the transaction level. Transaction steps that exceed this threshold are considered to have failed.

Of course, some different settings may be used. For example, another measurement policy may utilize a sampling interval of about 15 minutes (sampling 4 times per hour, with an interval of about 15 minutes between one sample and the next). Regarding timeout periods, a timeout period of about 30 seconds to about 45 seconds may be used. 15 seconds and 60 seconds are examples of other timeout periods that may be used.

FIG. 3 is an example of a comparison report template, and documentation of two business processes. In this example, a report template documents business processes that allow an end user to buy a notebook-style computer on a public web site. Column 301 provides a generic task list; these are tasks that a user is expected to perform in utilizing a general kind of business process. Column 302 documents the main application or business process, and column 305 documents a competing application or business process. Columns 302 and 305 document transaction steps an end user executes on each web site to buy the computer; they represent applying the generic task list to a first business process and a second business process. These transaction steps could be any steps involved in using an application. Some examples are steps involved in using a web site, a web application, web services, database management software, a customer relationship management system, an enterprise resource planning system, or an opportunity-management business process.

Column 308 documents applications supporting the steps in the main business process. Supporting applications may include applications directly or indirectly involved with transaction steps, such as back-end systems providing data or transaction processing to a web site. Thus providing a report template may comprise mapping a transaction step in the first business process to a supporting application. This mapping may provide an opportunity to improve the performance of the main business process. For example, performance degradation caused by a specific supporting application could be ascertained from reports based on the template, and proactive measures could be taken to improve performance.

Columns 303 and 306 provide space to be filled in with average response time values. Columns 304 and 307 document current performance thresholds for the main business process.

Row 321 contains column headings. Rows from 322 down to 333 document the mapping of the two business processes to each other by generic task groups, from the customer's perspective. For example, rows 326, 327, and 328 provide means for mapping transaction steps to similar transaction steps, by a generic task group ("customize and buy"). Rows from 322 down to 333 show each step in a business process, mapped to a current performance threshold for a main business process. Row 334 provides space to be filled in with response time total values.

FIG. 4 is an example of a performance comparison report, that communicates averages of response time values per transaction step, and averages of total response time values for each business process. As the example template does in FIG. 3, this example report in FIG. 4 documents business processes that allow an end user to buy a notebook-style computer. In columns 303 and 306, spaces are filled in with average response time values. In row 334, spaces are filled in with response time total values. Thus one may compare response time total values; column 303 at row 334 shows 35.582 seconds for the main business process, and column 306 at row 334 shows 19.686 seconds for the competing, comparable business process.

The report in this example comprises a means for aligning (e.g. in row 329) a representation of a transaction step (e.g. "add to cart," column 302, row 329) in a first application with the following: a representation of a similar transaction step ("add to cart," column 305, row 329) in a second application; a current threshold value (7.2 seconds, in column 304, row 329); a supporting application (application 2, in column 308, row 329); and a corresponding set of statistics (6.425 seconds in column 303, row 329, and 2.256 seconds in column 306, row 329). To extend this example, other techniques may be employed for associating a representation of a transaction step in a first application with representations of items like a similar transaction step in a second application, a current threshold value, a supporting application, and a corresponding set of performance measures. Connecting items with lines, or displaying in the same color, are some examples. A typical report would show averages based on a 7-day period. Various statistics and time periods could be used. Another example could use a 5-day or 10-day period.

As in FIG. 3, column 301 in FIG. 4 provides a generic task list. Column 302 documents the main application or business process, and column 305 documents a competing application or business process. Columns 302 and 305 document transaction steps an end user executes on each web site to buy the computer. Column 308 documents applications supporting the steps in the business process. Columns 304 and 307 document current performance thresholds for the main business process. Row 321 contains column headings. Rows from 322 down to 333 document the mapping of the two business processes to each other by generic task groups, from the customer's perspective.

FIG. 5 shows an example of a trend report, based on weekly averages of total response time values for each business process. These values may be taken from comparison reports like the example in FIG. 4. This is an example of useful trend reporting, that shows how a web site (represented by "company web shopping," at 500) performs over time against another web site (represented by "competitor," at 520). In FIG. 5, values at week 17 are taken from the comparison report example in FIG. 4. One may compare response time total values. In FIG. 5, at 510, the value reflects the value in FIG. 4, column 303 at row 334 (35.582 seconds for the main business process). In FIG. 5, at 529, the value reflects the value in FIG. 4, column 306 at row 334 (19.686 seconds for the competing, comparable business process).

The example in FIG. 5 may involve receiving performance measures and creating performance comparison reports, over a time period of at least several weeks, and producing a trend report for the time period, based on the performance measures.

Figure 6:
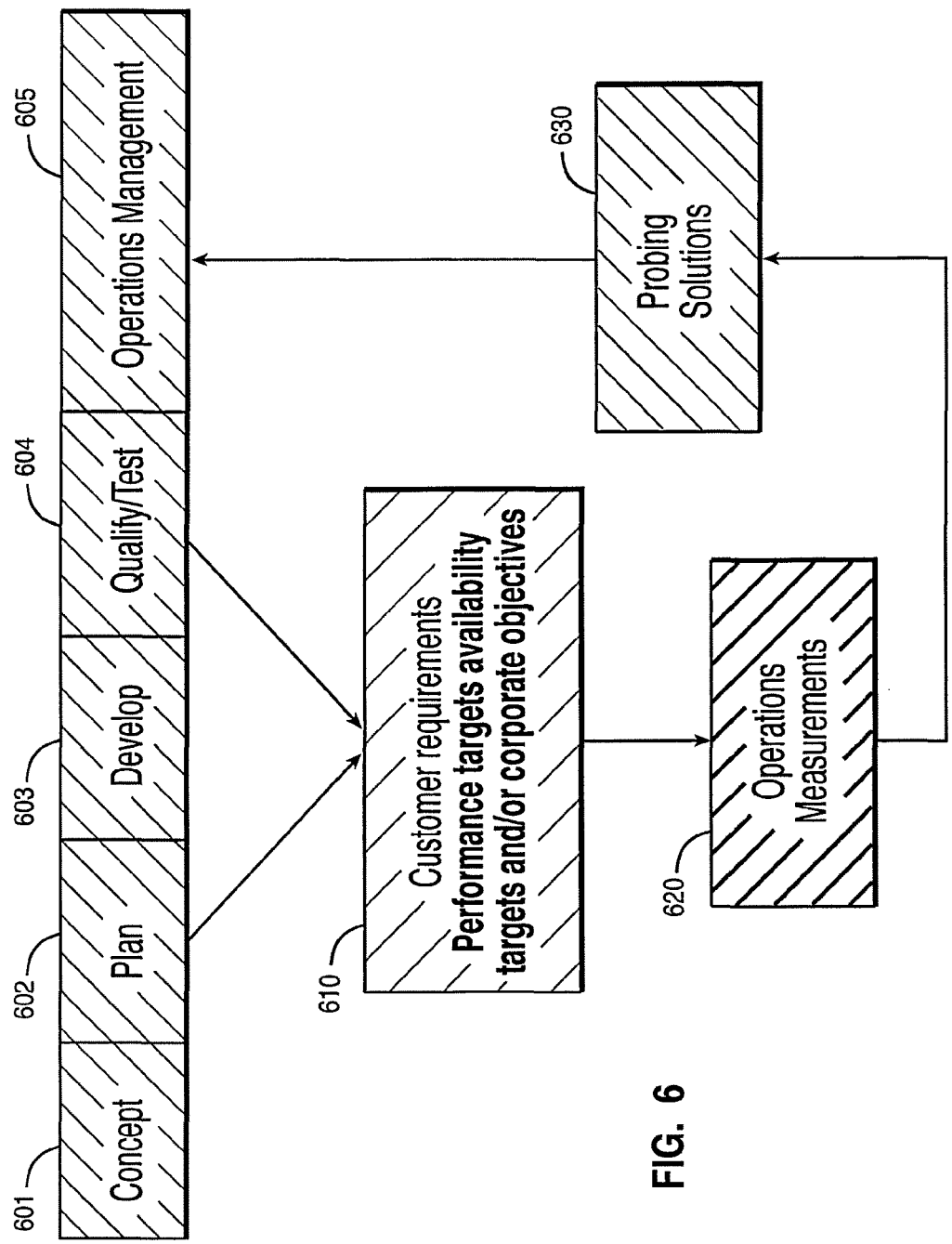
FIG. 6 is a block diagram illustrating one example of how performance measures and targets may be utilized in the development, deployment and management of an application.

FIG. 6 is a block diagram illustrating one example of how performance measures and targets may be utilized in the development, deployment and management of an application. Beginning with an overview, blocks 601, 602, 603, and 604 symbolize an example of a typical development process for an application (a web-based business application for example). This example begins with a concept phase at block 601, followed by a planning phase, block 602, and a development phase at block 603. Following a qualifying or testing phase at block 604, the application is deployed and the operations management phase is entered, at block 605. In the example in FIG. 6, performance measures and targets at block 610 are integrated with a development process.

Turning now to some details of the example in FIG. 6, blocks 602 and 610 are connected by an arrow, symbolizing that in the planning phase, customer requirements at 610 (e.g. targets for performance) are understood and documented. Thus block 610 comprises setting threshold values, and documenting the threshold values. Work proceeds with developing the application at block 603. The documented threshold values may provide guidance and promote good design decisions in developing the application. Once developed, an application is evaluated against the threshold values. Thus the qualifying or testing phase at block 604, and block 610, are connected by an arrow, symbolizing measuring the application's performance against the threshold values at 610. This may lead to identifying an opportunity to improve the performance of an application, in the qualifying or testing phase at block 604.

As an application is deployed into a production environment, parameters are established to promote consistent measurement by probes. Thus the example in FIG. 6 further comprises: deploying the application (transition from qualifying or testing phase at block 604 to operations at block 605), providing an operations-measurement policy for the application (at block 620, specifying how measures are calculated and communicated for example), and providing probing solutions for the application (at block 630). Probing solutions at block 630 are described above in connection with probes shown at 235 in FIG. 2. Blocks 620, 630, and 605 are connected by arrows, symbolizing utilization of operations measurements at 620, and utilization of probing solutions at 630, in managing the operation of an application at 605. For example, the operations management phase at 605 may involve utilizing the outputs from operations measurements at 620 and probing solutions at 630. A representation of a mapping of statistics to threshold values may be utilized in managing the operation of an application, identifying an opportunity to improve the performance of an application, and taking corrective action.

Continuing with details of the example in FIG. 6, there may be practical difficulties in defining useful targets for performance at 610. Sometimes applications are developed and deployed without the definition of performance targets. Sometimes customers cannot express what their performance requirements are. In these situations, the solutions described here may produce useful performance targets, or corporate objectives, or both, based on the performance of "best-of-breed" competition. For example, an application that is being developed or redesigned may be compared with another application that has a good reputation (perhaps another application provided by a business competitor). Performance measures and targets are further described below in connection with FIG. 7.

Figure 7:
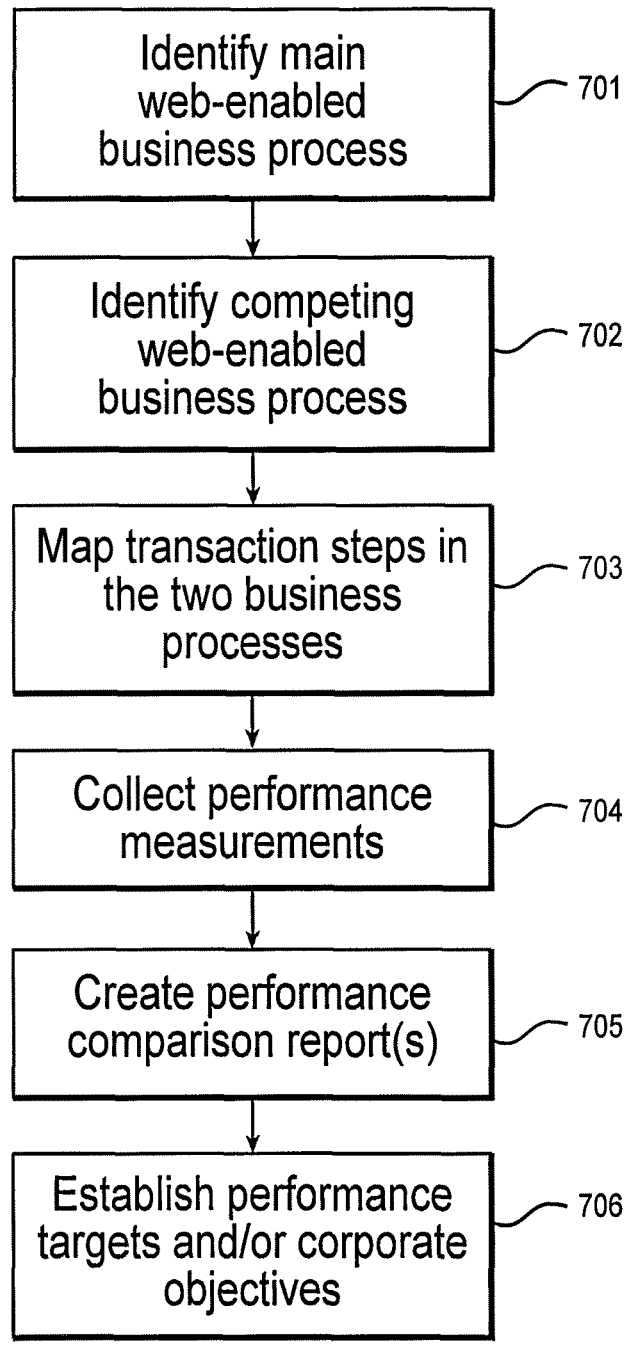
FIG. 7 is a flow chart illustrating an example of a measurement process, according to the teachings of the present invention.

FIG. 7 is a flow chart illustrating an example of a measurement process, according to the teachings of the present invention. The example in FIG. 7 begins at block 701, identifying a main, web-enabled business process. This may be a business process that is being developed or redesigned. "Web-enabled" means that a communications network is utilized to perform at least part of the business process. Block 702 represents identifying a competing, web-enabled business process. This may be a business process that has a good reputation, and may be provided by a business competitor.

Block 703 represents mapping transaction steps in the two business processes. This mapping may comprise mapping a transaction step in a first application to: a similar transaction step in a second application, a current threshold value, and a supporting application. Creating and using a generic task list (see FIG. 3) is one way of mapping transaction steps. This may involve providing a generic task list, and applying the generic task list to a first business process and a second business process. Applying a generic task list includes mapping a transaction step in the first business process to a similar transaction step in the second business process. For example, providing a generic task list may involve starting with a list of generic tasks (e.g. see FIG. 3, column 301) that a user is expected to perform in utilizing a general kind of business process. Applying the generic task list may involve discovering and documenting exactly how a user performs generic tasks in each particular business process that is being evaluated. Finally, a finished report template may emerge, like the one illustrated in FIG. 3.

If the mapping at block 703 was successful, it is reasonable to proceed to block 704, collecting performance measurements. This aspect was covered in the description given above for FIG. 2. This involves receiving performance measures for the first and second business processes, or inputting performance measures for the first and second applications. Typically block 704 involves receiving data from a production environment, and deriving statistics from the data.

Block 705 represents creating one or more performance comparison reports. This was covered in the description given above for FIGS. 2 and 4. This involves creating a performance comparison report, based on the template and the performance measures, or outputting a performance comparison report based on the mapping and the performance measures.

Creating a performance comparison report comprises associating at least one performance measure with a corresponding current threshold value. The mapping, inputting, and outputting may be performed for a plurality of transaction steps in a first application and a plurality of transaction steps in a second application, as illustrated in FIGS. 3 and 4.

Optionally, the process in FIG. 7 could continue to block 706, establishing performance targets, or corporate objectives, or both. (This was covered in the discussion above regarding block 610 in FIG. 6.) Block 706 may involve establishing at least one new threshold value for the main business process, based on the performance measures. Block 706 may involve documenting the new threshold value, and managing the main business process, whereby the main business process is measured against the new threshold value.

Regarding FIG. 7, the order of the operations in the processes described above may be varied. For example, it is within the practice of the invention for block 702 to occur simultaneously with block 701. Those skilled in the art will recognize that blocks in FIG. 7, described above, could be arranged in a somewhat different order, but still describe the invention. Blocks could be added to the above-mentioned diagram to describe details, or optional features; some blocks could be subtracted to show a simplified example.

In conclusion, we have shown examples of solutions to problems related to performance targets and comparison of business processes, or comparison of applications such as web sites, web services, or other applications accessible to a number of users via a network.

One of the possible implementations of the invention is an application, namely a set of instructions (program code) executed by one or more processors of a computer or computer system from a computer-readable storage device such as a memory of a computer. Until required by the computer, the set of instructions may be stored in another computer memory or computer readable storage device, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable computer-readable storage device having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the method. A computer system for implementing the present invention may comprise one or more processors, one or more computer-readable memories, one or more computer-readable storage devices, and program instructions stored on at least one of the one or more storage devices for execution by at least one of the one or more processors via at least one of the one or more memories. A computer program product for implementing the present invention may comprise one or more computer-readable storage devices and program instructions stored on at least one of the one or more storage devices. The term "computer-readable storage device" does not encompass signal propagation media such as copper cables, optical fibers and wireless transmission media.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

The invention claimed is:

1. A method for evaluating performance of software applications of different Internet web sites, the method comprising:
   mapping, by one or more processors of a computer system, a plurality of steps in a first software application at a first computer within a first Internet web site to a respective plurality of similar-function steps in a second software application at a second computer within a second Internet site, wherein the mapping for each of the plurality of steps in the first software application includes associating both each step in the first software application and the respective similar-function step in the second software application with a respective first task of a plurality of first tasks;
   determining, by the one or more processors, and including in a report as a comparison, measures of performance of each mapped step in the first software application and measures of performance of the respective similar-function steps and of other steps in the second software application;
   determining, by the one or more processors, and including in the report, a measure of performance of the first software application based on the measures of performance of each mapped step in the first software application;
   determining, by the one or more processors, and including in the report, a measure of performance of the second software application based on the measures of performance of the respective similar-function steps in the second software application and of the other steps in the second software application; and
   improving, by the one or more processors, performance of: (i) the first software application by utilizing the measure of performance of the first software application, (ii) the second software application by utilizing the measure of performance of the second software application, or (iii) both the first software application and the second software application by utilizing the measure of performance of the first software application and the measure of performance of the second software application, respectively.

2. The method of claim 1, further comprising:
   determining, by the one or more processors, the measures of performance of each mapped step in the first software application and the measures of performance of the respective similar-function steps and of the other steps in the second software application, including collecting and statistically analyzing data that measures performance of each mapped step in the first software application, the respective similar-function steps in the second software application, and the other steps in the second software application.

3. The method of claim 1, further comprising:
   determining, by one or more processors, the other steps in the second software application as being steps in the second software application that are associated with a plurality of second tasks such that each second task is not comprised by the plurality of first tasks, wherein the other steps in the second software application do not correspond to any of the mapped steps in the first software application.

4. The method of claim 3, further comprising:
   including in the report, by the one or more processors, the measure of performance of the first software application, the measure of performance of the second software application, the plurality of first tasks, the plurality of second tasks, the plurality of steps in the first software application, the plurality of respective similar-function steps in the second software application, and the other steps in the second software application.

5. The method of claim 4, the method comprising:
   generating, the one or more processors, the report that includes a table,
   wherein the table includes a row for each first task and for each second task, a first column comprising the mapped steps in the first software application, a second column comprising both the respective similar-function steps and the other steps in the second software application, a third column comprising the measure of performance of the first software application and the measure of performance of the mapped steps in the first software application, a fourth column comprising the measure of performance of the second software application and the measure of performance of both the respective similar-function steps and the other steps in the second software application, and a fifth column of other software applications supporting the mapped steps in the first software application,
   wherein each mapped step in the first software application and the respective similar-function step in the second software application associated with a respective first task of the plurality of first tasks appears in the row pertaining to the respective first task, and
   wherein each other step in the second software application associated with a respective second task of the plurality of second tasks appears in the row pertaining to the respective second task.

6. The method of claim 1, further comprising:
   posting the report to a web site and/or sending the report by email to an email recipient.

7. A computer program product for evaluating performance of software applications of different Internet web sites, the computer program product comprising one or more computer-readable hardware storage devices and program instructions stored on at least one of the one or more storage devices, the program instructions comprising:
   program instructions to map a plurality of steps in a first software application at a first computer within a first Internet web site to a respective plurality of similar-function steps in a second software application at a second computer within a second Internet web site, including for each of the plurality of steps in the first software application program instructions to associate both each step in the first software application and the respective similar-function step in the second software application with a respective first task of a plurality of first tasks;

program instructions to determine, and to include in a report as a comparison, measures of performance of each mapped step in the first software application and measures of performance of the respective similar-function steps and of other steps in the second software application;

program instructions to determine, and to include in the report, a measure of performance of the first software application based on the measures of performance of each mapped step in the first software application; and program instructions to determine, and to include in the report, a measure of performance of the second software application based on the measures of performance of the respective similar-function steps in the second software application and of the other steps in the second software application; and program instructions to improve performance of: (i) the first software application by utilizing the measure of performance of the first software application, (ii) the second software application by utilizing the measure of performance of the second software application, or (iii) both the first software application and the second software application by utilizing the measure of performance of the first software application and the measure of performance of the second software application, respectively.

8. The computer program product of claim 7, further comprising:

program instructions to determine the measures of performance of each mapped step in the first software application and the measures of performance of the respective similar-function steps and of the other steps in the second software application, including program instructions to collect and statistically analyze data that measures performance of each mapped step in the first software application, the respective similar-function steps in the second software application, and the other steps in the second software application.

9. The computer program product of claim 7, further comprising:

program instructions to determine other steps in the second software application as being steps in the second software application that are associated with a plurality of second tasks such that each second task is not comprised by the plurality of first tasks, wherein the other steps in the second software application do not correspond to any of the mapped steps in the first software application.

10. The computer program product of claim 9, further comprising:

program instructions to include in the report the measure of performance of the first software application, the measure of performance of the second software application, the plurality of first tasks, the plurality of second tasks, the plurality of steps in the first software application, the plurality of respective similar-function steps in the second software application, and the other steps in the second software application.

11. The computer program product of claim 10, the method comprising:

program instructions to generate the report that includes a table, wherein the table includes a row for each first task and for each second task, a first column comprising the mapped steps in the first software application, a second column comprising both the respective similar-function steps and the other steps in the second software application, a third column comprising the measure of performance of the first software application and the measure of performance of the mapped steps in the first software application, a fourth column comprising the measure of performance of the second software application and the measure of performance of both the respective similar-function steps and the other steps in the second software application, and a fifth column of other software applications supporting the mapped steps in the first software application, wherein each mapped step in the first software application and the respective similar-function step in the second software application associated with a respective first task of the plurality of first tasks appears in the row pertaining to the respective first task, and wherein each other step in the second software application associated with a respective second task of the plurality of second tasks appears in the row pertaining to the respective second task.

12. The computer program product of claim 7, further comprising:

program instructions to post the report to a web site and/or to send the report by email to an email recipient.

13. A computer system for evaluating performance of software applications of different Internet web sites, the computer system comprising:

one or more processors, one or more computer-readable memories, one or more computer-readable storage devices, and program instructions stored on at least one of the one or more storage devices for execution by at least one of the one or more processors via at least one of the one or more memories, the program instructions comprising:

program instructions to map a plurality of steps in a first software application at a first computer within a first Internet web site to a respective plurality of similar-function steps in a second software application at a second computer within a second Internet web site, including for each of the plurality of steps in the first software application program instructions to associate both each step in the first software application and the respective similar-function step in the second software application with a respective first task of a plurality of first tasks;

program instructions to determine, and to include in a report as a comparison, measures of performance of each mapped step in the first software application and measures of performance of the respective similar-function steps and of other steps in the second software application;

program instructions to determine, and to include in the report, a measure of performance of the first software application based on the measures of performance of each mapped step in the first software application; and program instructions to determine, and to include in the report, a measure of performance of the second software application based on the measures of performance of the respective similar-function steps in the second software application and of the other steps in the second software application; and program instructions to improve performance of: (i) the first software application by utilizing the measure of performance of the first software application, (ii) the second software application by utilizing the measure of performance of the second software application, or (iii) both the first software application and the second software application by utilizing the measure of performance of the first software application and the measure of performance of the second software application, respectively.

14. The computer system of claim 13, further comprising:
program instructions to determine the measures of performance of each mapped step in the first software application and the measures of performance of the respective similar-function steps and of the other steps in the second software application, including program instructions to collect and statistically analyze data that measures performance of each mapped step in the first software application, the respective similar-function steps in the second software application, and the other steps in the second software application.

15. The computer system of claim 13, further comprising:
program instructions to determine other steps in the second software application as being steps in the second software application that are associated with a plurality of second tasks such that each second task is not comprised by the plurality of first tasks, wherein the other steps in the second software application do not correspond to any of the mapped steps in the first software application.

16. The computer system of claim 15, further comprising:
program instructions to include in the report the measure of performance of the first software application, the measure of performance of the second software application, the plurality of first tasks, the plurality of second tasks, the plurality of steps in the first software application, the plurality of respective similar-function steps in the second software application, and the other steps in the second software application.

17. The computer system of claim 16, the method comprising:
program instructions to generate the report that includes a table,
wherein the table includes a row for each first task and for each second task, a first column comprising the mapped steps in the first software application, a second column comprising both the respective similar-function steps and the other steps in the second software application, a third column comprising the measure of performance of the first software application and the measure of performance of the mapped steps in the first software application, a fourth column comprising the measure of performance of the second software application and the measure of performance of both the respective similar-function steps and the other steps in the second software application, and a fifth column of other software applications supporting the mapped steps in the first software application,
wherein each mapped step in the first software application and the respective similar-function step in the second software application associated with a respective first task of the plurality of first tasks appears in the row pertaining to the respective first task, and
wherein each other step in the second software application associated with a respective second task of the plurality of second tasks appears in the row pertaining to the respective second task.

18. The computer system of claim 13, further comprising:
program instructions to post the report to a web site and/or to send the report by email to an email recipient.

* * * * *